United States Patent
Sato

(10) Patent No.: US 9,266,342 B2
(45) Date of Patent: Feb. 23, 2016

(54) STORAGE DEVICE, HOST APPARATUS, CIRCUIT SUBSTRATE, LIQUID CONTAINER, AND SYSTEM

(75) Inventor: Jun Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 613 days.

(21) Appl. No.: 13/451,434

(22) Filed: Apr. 19, 2012

(65) Prior Publication Data

US 2012/0272018 A1 Oct. 25, 2012

(30) Foreign Application Priority Data

Apr. 22, 2011 (JP) ................................. 2011-096486

(51) Int. Cl.
| | |
|---|---|
| G06F 12/00 | (2006.01) |
| G06F 13/00 | (2006.01) |
| G06F 13/28 | (2006.01) |
| B41J 2/175 | (2006.01) |
| G06F 11/14 | (2006.01) |

(52) U.S. Cl.
CPC ......... *B41J 2/17546* (2013.01); *G06F 11/1443* (2013.01)

(58) Field of Classification Search
CPC ..... G06F 12/00; G06F 11/004; B41J 2/17546
USPC ....................................... 711/154, 167; 347/5
See application file for complete search history.

(56) References Cited

U.S. PATENT DOCUMENTS

| | | | | |
|---|---|---|---|---|
| 7,697,372 | B2 * | 4/2010 | Asauchi | 365/239 |
| 2004/0239706 | A1 | 12/2004 | Kawakami | |
| 2006/0139692 | A1 | 6/2006 | Asauchi | |
| 2008/0106757 | A1 * | 5/2008 | Asauchi | 358/1.15 |
| 2009/0287891 | A1 * | 11/2009 | Nakano | 711/155 |
| 2010/0254202 | A1 | 10/2010 | Asauchi | |
| 2010/0257305 | A1 * | 10/2010 | Asauchi | 711/102 |
| 2010/0257327 | A1 * | 10/2010 | Kosugi | 711/162 |
| 2011/0292102 | A1 | 12/2011 | Asauchi | |
| 2012/0074031 | A1 * | 3/2012 | Sato | 206/525 |

FOREIGN PATENT DOCUMENTS

| | | |
|---|---|---|
| JP | 2002-014870 A | 1/2002 |
| JP | 2004-142379 A | 5/2004 |
| JP | 2010-188574 A | 9/2010 |
| JP | 2011-081659 A | 4/2011 |

* cited by examiner

*Primary Examiner* — Ryan Bertram
(74) *Attorney, Agent, or Firm* — Kilpatrick Townsend & Stockton LLP

(57) ABSTRACT

A storage device includes a control unit that performs a process of communicating with a host apparatus which is connected to the storage device through a bus, a storage unit into which data transmitted from the host apparatus are written, and a storage control unit that performs access control on the storage unit. The control unit receives an ID information item from the host apparatus after the end of a period of writing data from the host apparatus to m (m is an integer equal to or greater than 1) storage devices of a plurality of the storage devices connected to the bus, and returns an acknowledgement to the host apparatus if the data transmitted from the host apparatus have been successfully written to the storage unit of the storage device.

17 Claims, 10 Drawing Sheets

STORAGE DEVICE, HOST APPARATUS, CIRCUIT SUBSTRATE, LIQUID CONTAINER, AND SYSTEM

BACKGROUND

1. Technical Field

The present invention relates to a storage device, a host apparatus, a circuit substrate, a liquid container, and a system.

2. Related Art

Some ink cartridges (liquid containers) for use in ink jet printers are provided with a storage device. The storage device stores information such as ink color and ink consumption. The data on the ink consumption are transmitted from a printer main body (host apparatus) to the storage device, and are written into a nonvolatile memory provided in the storage device. In such a system, the storage device returns an acknowledgement, thereby reporting to the host apparatus that the data writing operation has been completed. That is, the storage device receives data from the host apparatus, writes the data into the memory, and returns an acknowledgement after completion of the write operation. The host apparatus receives the acknowledgement and then transmits data to the subsequent storage device. Usually, the time required for performing writing into a nonvolatile memory is longer than the data communication time. Therefore, the greater the number of storage devices is, the longer the overall write process time becomes.

On the other hand, the ink cartridges are usually configured to be replaceable, and therefore a contact failure is likely to occur in an electrical connection, which may result in a transmission error, a write error, or the like. In order to prevent occurrence of such troubles, it is desirable to reduce the time required for a process of performing writing from the host apparatus to each storage device as much as possible.

To this end, JP-A-2002-14870 discloses a method that writes data simultaneously into a plurality of storage devices. This method, however, has problems such as that a host apparatus cannot receive an acknowledgement from each storage device.

SUMMARY

An advantage of some aspects of the invention is that it provides a storage device, a host apparatus, a circuit substrate, a liquid container, and a system that can send and receive an acknowledgement and reduce the write process time.

According to an aspect of the invention, there is provided a storage device including: a control unit that performs a process of communicating with a host apparatus which is connected to the storage device through a bus; a storage unit into which data transmitted from the host apparatus are written; and a storage control unit that performs access control on the storage unit, wherein the control unit is configured to receive an ID information item from the host apparatus after the end of a period of writing data from the host apparatus to m (m is an integer equal to or greater than 1) storage devices of a plurality of the storage devices connected to the bus, and return an acknowledgement to the host apparatus if the data transmitted from the host apparatus have been successfully written to the storage unit of the storage device.

According to the above aspect of the invention, the storage device can receive an ID information item from the host apparatus after the end of a period of writing data from the host apparatus to m storage devices, and return an acknowledgement to the host apparatus if the data transmitted from the host apparatus have been successfully written. Thus, the host apparatus can receive acknowledgements sequentially from the respective storage devices after completion of data writing operations with respect to the m storage devices. This allows the host apparatus to determine whether the data writing operations have been successfully performed in the respective storage devices, and makes it possible to reduce the time required for a process of write from the host apparatus to the m storage devices. This also makes it possible to reduce the risk of transmission errors, write errors, or the like, due to a contact failure in an electrical connection in the storage devices.

The storage device according to the above aspect of the invention may further include a reset terminal. Further, the control unit may be configured to receive one of m ID information items corresponding to the m storage devices in each of first through m-th (m is an integer equal to or greater than 2) reset cancellation periods, in which a reset signal input to the reset terminal from the host apparatus is at a level indicating that reset is cancelled, and return the acknowledgement to the host apparatus if the received one of the ID information items matches an ID information item of the storage device.

With this configuration, the storage device can return an acknowledgement if the received ID information item matches the ID information item of the storage device, and hence the host apparatus can specify the storage devices that have returned an acknowledgement and the storage devices that have not returned an acknowledgement.

The storage device according to the above aspect of the invention may further include a clock terminal. Further, the control unit may be configured to receive the one of the ID information items in accordance with a clock of a first clock period that is input to the clock terminal, and return the acknowledgement in accordance with a clock of a second period that is input to the clock terminal after the first clock period.

With this configuration, the storage device can receive an ID information item in synchronization with a clock transmitted from the host apparatus, and return an acknowledgement in synchronization with another clock transmitted thereafter. Thus, a period in which the storage device receives an ID information item and a period in which the storage device returns an acknowledgement can be temporally separated from each other, which makes it possible to reliably receive the ID information item and transmit the acknowledgement.

According to the above aspect of the invention, the control unit may be configured to determine whether the data transmitted from the host apparatus have been successfully written to the storage unit based on an internal acknowledgement signal that is output from the storage control unit.

With this configuration, the host storage device can return an acknowledgement if the data transmitted from the host apparatus have been successfully written to the storage unit.

The storage device according to the above aspect of the invention may further include a data terminal. Further, the control unit may be configured to output a signal of a logic level representing the acknowledgement from the data terminal in accordance with the clock of the second clock period.

With this configuration, the storage device can output a signal of a logic level representing an acknowledgement from the data terminal at an appropriate timing, and can thus reliably return an acknowledgement to the host apparatus.

According to the above aspect of the invention, the control unit may be configured to shift the data terminal from a high impedance state to a first logic level and then shift the data terminal from the first logic level to a second logic level in accordance with the clock of the second clock period; and shift the data terminal back to the high impedance state after the end of the second clock period.

With this configuration, the storage device can rapidly shift a voltage level of the data terminal from the first logic level to the second logic level in the last half of the second clock period, and therefore a waiting time until a next ID information item is transmitted can be reduced. This makes it possible to reduce the time required for the entire write process, for example.

According to another aspect of the invention, there is provided a host apparatus including: a communication processing unit that performs a process of communicating with a plurality of storage devices which are connected to the host apparatus through a bus; and a control unit that controls the communication processing unit, wherein the communication processing unit is configured to, after the end a period of writing data from the host apparatus to m (m is an integer greater than 1) storage devices of the plurality of storage devices, transmit m ID information items corresponding to the m storage devices, and perform an acknowledgement reception process after transmission of the ID information items.

According to the above aspect of the invention, the host apparatus can receive acknowledgements sequentially from the respective storage devices after completion of data writing operations with respect to the m storage devices. This allows the host apparatus to determine whether the data writing operations have been successfully performed in the respective storage devices, and makes it possible to reduce the time required for a process of write from the host apparatus to the m storage devices. This also makes it possible to reduce the risk of transmission errors, write errors, or the like, due to a contact failure in an electrical connection in the storage devices.

The host apparatus according to the above aspect of the invention may further include a reset terminal. Further, the communication processing unit may be configured to transmit one of the m ID information items in each of first through m-th (m is an integer equal to or greater than 2) reset cancellation periods in which a reset signal output from the reset terminal is at a level indicating that reset is cancelled, and perform the acknowledgement reception process.

With this configuration, the host apparatus can specify a storage device requesting for return of an acknowledgement. Thus, the host apparatus can recognizes from which storage device the acknowledgement is returned.

The host apparatus according to the above aspect of the invention may further include a clock terminal and a data terminal. Further, the communication processing unit may be configured to, in a first clock period in each of the first through m-th reset cancellation periods, output a clock of the first clock period from the clock terminal, and output one of the m ID information items from the data terminal in accordance with the clock of the first clock period; and, in a second clock period after the first clock period in each of the reset cancellation periods, output from the clock terminal a clock of the second clock for receiving the acknowledgement.

With this configuration, the host apparatus can output a clock from the clock terminal, transmit an ID information item in synchronization with the clock, and receive an acknowledgement in synchronization with another clock which is output thereafter. Thus, a period in which the host apparatus transmits an ID information item and a period in which the host apparatus receives an acknowledgement can be temporally separated from each other, which makes it possible to reliably transmit the ID information item and receive the acknowledgement.

According to the above aspect of the invention, the communication processing unit may be configured to set the data terminal to a high impedance state after the end of the first clock period.

With this configuration, it is possible to prevent the data terminal of the host apparatus from interfering with an acknowledgement signal which is output from the storage device in the second clock period after the first clock period. Thus, the host apparatus can reliably receive the acknowledgement returned from the storage device.

According to still another aspect of the invention, there is provided a circuit substrate including the above-described storage device.

According to still another aspect of the invention, there is provided a liquid container including the above-described storage device.

According to still another aspect of the invention, there is provided a system including the above-described storage device and the above-described host apparatus.

In the system according to the above aspect of the invention, both the data terminal of the storage device and the data terminal of the host apparatus may be set to a high impedance state in a period between the first clock period and the second clock period.

In this way, the data terminals connected to the bus are set to the high impedance state in a period after completion of transmission of the ID information item and before the start of acknowledgement return. This makes it possible to prevent mutual interference between the signal of the ID information item and the acknowledgement signal, thereby achieving reliable transmission/reception of both signals.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Hereinafter, preferred embodiments of the invention will be described in detail. The following embodiments are not intended to limit the invention described in the appended claims, and not all the elements illustrated in the following embodiments are essential to achieve the advantage of the invention.

1. Storage Device and Host Apparatus

Figure 1:
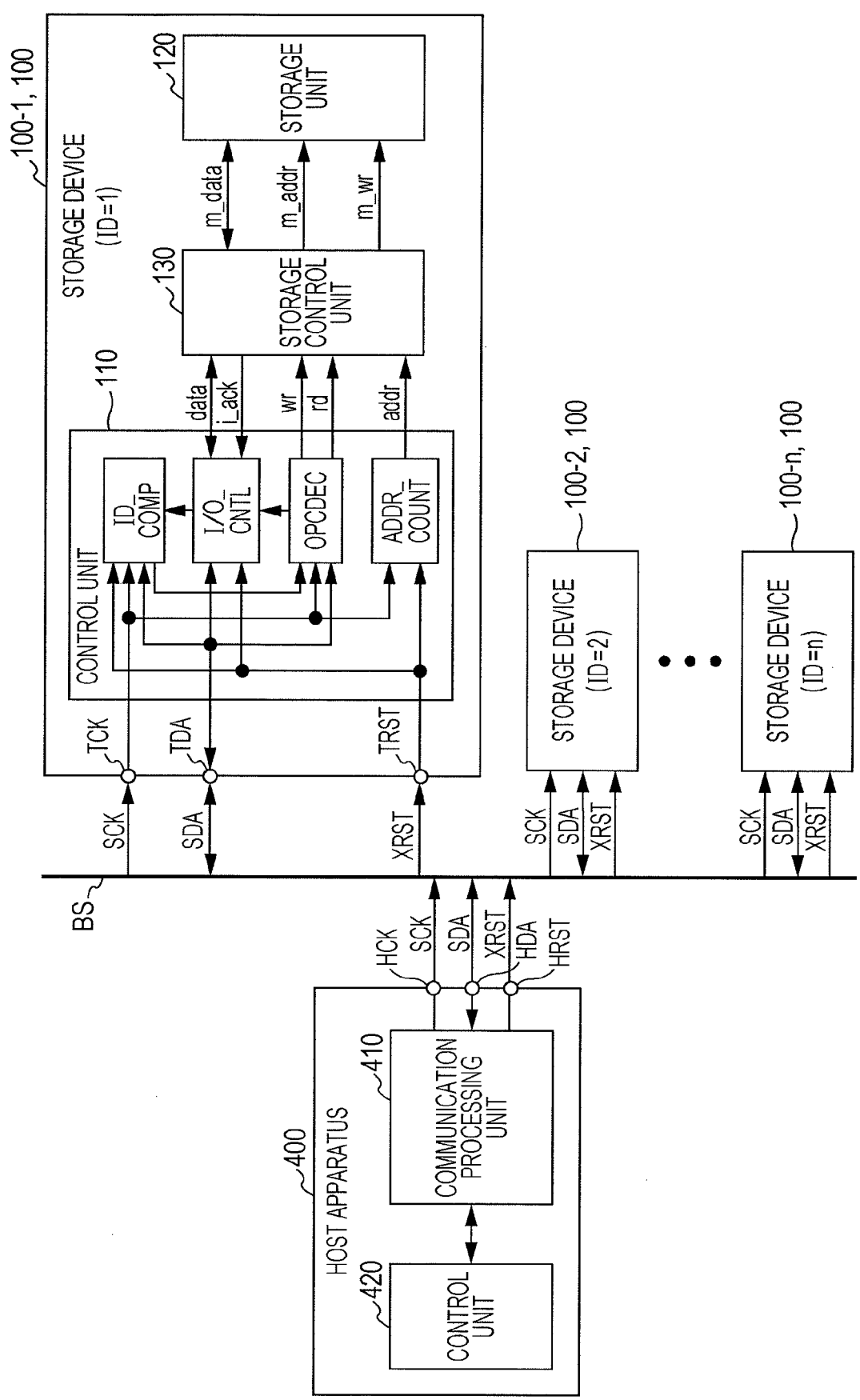
FIG. 1 is a diagram showing an exemplary basic configuration of a storage device and a host apparatus.

FIG. 1 is a diagram illustrating an exemplary basic configuration of a storage device 100 and a host apparatus 400 according to an embodiment. The storage device 100 of this embodiment includes a control unit 110, a storage unit 120, and a storage control unit 130. The host apparatus 400 of this embodiment includes a communication processing unit 410, and a control unit 420. The storage device 100 and the host apparatus 400 of this embodiment are not limited to the configurations shown in FIG. 1, and may be variously modified by, for example, omitting some of the elements, replacing some of the elements with other elements, or adding other elements.

A plurality of the storage devices 100-1 through 100-n (n is an integer equal to or greater than 2) are connected to the host apparatus 400 through a bus BS. As shown in FIG. 1, for example, the bus BS includes a clock signal line SCK, a data signal line SDA, and a reset signal line XRST. The host apparatus 400 supplies a clock to the plurality of storage devices 100-1 through 100-n through the clock signal line SCK. Further, data and the like are exchanged between the host apparatus 400 and each of the storage devices 100 through the data signal line SDA. Also, the host apparatus 400 outputs a reset signal to the plurality of storage devices 100-1 through 100-n through the reset signal line XRST.

The plurality of storage devices 100-1 through 100-n have respective identification (ID) information items. The host apparatus 400 specifies one of the ID information items to send a command and data to the corresponding one of the plurality of storage devices 100-1 through 100-n. For example, in FIG. 1, the ID information item of the first storage device 100-1 is ID=1, and the ID information item of the second storage device 100-2 is ID=2.

Each of the storage devices 100 includes a clock terminal TCK, a data terminal TDA, and a reset terminal TRST. The clock signal line SCK is connected to the clock terminal TCK; the data signal line SDA is connected to the data terminal TDA; and the reset signal line XRST is connected to the reset terminal TRST.

The control unit 110 of the storage device 100 performs a process of communicating with the host apparatus 400 connected through the bus BS. More specifically, as shown in FIG. 1, for example, in accordance with the clock and the reset signal transmitted from the host apparatus 400, the control unit 110 receives a command and write data from the host apparatus through the data signal line SDA, and transmits data read from the storage unit 120, an acknowledgement (described below), and the like, to the host apparatus 400 through the data signal line SDA.

The storage unit 120 is a nonvolatile memory device, such as an EEPROM or a ferroelectric memory, into which data transmitted from the host apparatus 400 are written. The storage control unit 130 performs access control on the storage unit 120.

The control unit 110 includes, for example, an ID comparator ID_COMP, an I/O controller I/O_CNTL, an operation code decoder OPCDEC, and an address counter ADDR_COUNT. The ID comparator ID_COMP compares an ID information item transmitted from the host apparatus 400 with the ID information item of the storage device 100 to determine whether the ID information item transmitted from the host apparatus 400 matches the ID information item of the storage device 100. When the ID information items match each other, the ID comparator ID_COMP outputs an enable signal to the operation code decoder OPCDEC. Then, the operation code decoder OPCDEC decodes a command (operation code) transmitted from the host apparatus 400. On the other hand, if the ID information item transmitted from the host apparatus 400 does not match the ID information item of the storage device 100, the transmitted command is ignored.

More specifically, if the command transmitted from the host apparatus 400 is a write command, the I/O controller I/O_CNTL receives write data transmitted from the host apparatus 400, and outputs the received write data "data" to the storage control unit 130. The storage control unit 130 writes memory data m_data into the storage unit 120 in accordance with a write instruction wr from the operation code decoder OPCDEC. Address information addr for writing the memory data m_data is generated by the address counter ADDR_COUNT based on the clock from the host apparatus 400. The write data are written sequentially, i.e., in the order in which the write data are transmitted, into consecutive addresses in the storage unit 120.

If the write data have been successfully written to the storage unit 120, the storage control unit 130 outputs an internal acknowledgement signal i_ack to the I/O controller I/O_CNTL.

According to the internal acknowledgement signal i_ack from the storage control unit 130, the control unit 110 can determined whether the data transmitted from the host apparatus 400 have been successfully written to the storage unit 120. Then, if an ID information item that matches the ID information item of the storage device 100 is received from the host apparatus 400, the I/O controller I/O_CNTL returns an acknowledgement ACK to the host apparatus 400. The host apparatus 400, having received the acknowledgement ACK, can recognize that data have been successfully written to each storage device 100. It should be noted that the acknowledgement ACK will be described below in greater detail.

If the command transmitted from the host apparatus 400 is a read command, the storage control unit 130 reads memory data m_data from the storage unit 120 in accordance with a read instruction rd from the operation code decoder OPCDEC. Address information addr for reading the memory data m_data is also generated by the address counter ADDR_COUNT based on the clock from the host apparatus 400, and the memory data m_data are sequentially read from the storage unit 120.

The host apparatus 400 includes the communication processing unit 410, the control unit 420, a clock terminal HCK, a data terminal HDA, and a reset terminal HRST. The communication processing unit 410 performs a process of communicating with the plurality of storage devices 100-1 through 100-n connected through the bus BS. The control unit 420 controls the communication processing unit 410.

The communication processing unit 410 transmits write data to each of m (m is an integer satisfying 1≤m≤n) storage devices out of the plurality of storage devices 100-1 through 100-n connected to the bus BS to write the write data into the storage unit 120 of each of the m storage devices 100.

After the end of a period of writing data to the m storage devices 100 out of the plurality of storage devices 100-1 through 100-n, the communication processing unit 410 transmits one of m ID information items corresponding to the m storage devices 100, and performs an acknowledgement reception process after transmitting one of the ID information items.

According to the storage device 100 and the host apparatus 400 of this embodiment, the control unit 110 returns an acknowledgement to the host apparatus 400 if two conditions are satisfied. The first condition is that, after the end of the period of writing data to the m storage devices out of the plurality of storage devices 100-1 through 100-n, an ID information item is received from the host apparatus 400, and the received ID information item matches the ID information item of the storage device 100. The second condition is that data transmitted from the host apparatus 400 have been successfully written to the storage unit 120 of the storage device 100.

In this manner, the host apparatus 400 can receive acknowledgements sequentially from the respective storage devices 100 after completion of data writing operations with respect to the m storage devices. This allows the host apparatus 400 to determine whether the data writing operations have been successfully performed in the respective storage devices 100, and makes it possible to reduce the time required for writing data.

Figure 2:
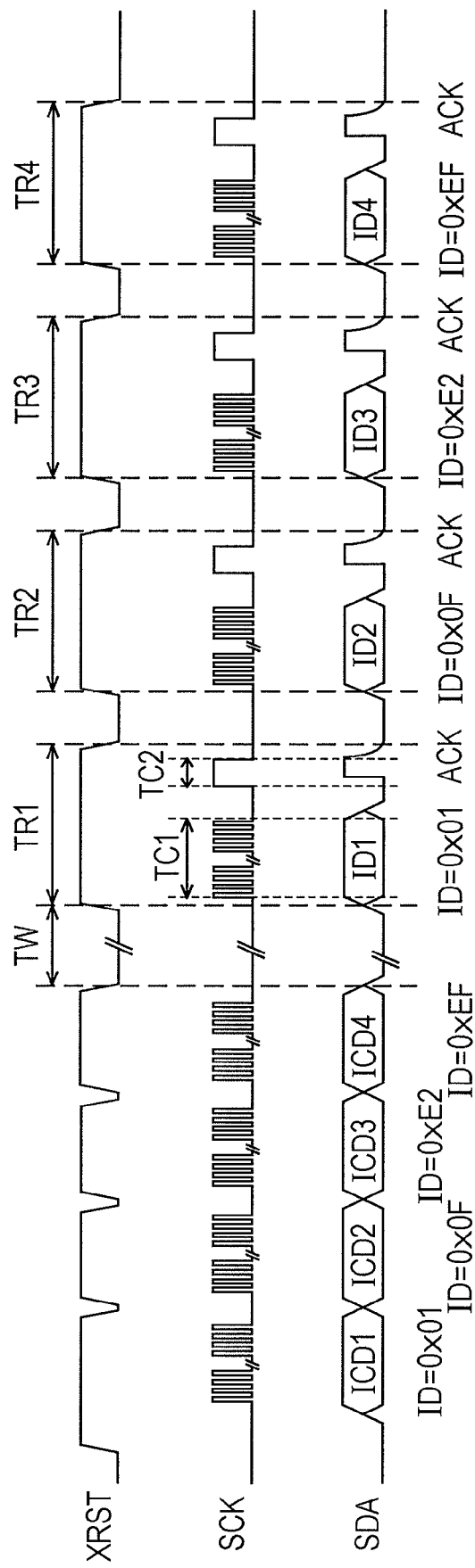
FIG. 2 is a timing chart illustrating a process of returning an acknowledgement.

FIG. 2 is a timing chart illustrating a process of returning an acknowledgement performed in the storage device 100 of this embodiment. In FIG. 2, waveforms of a reset signal XRST, a clock signal SCK, and a data signal SDA are shown. It should be noted that FIG. 2 illustrates the case of n=4 and m=4, i.e., in the case where four storage devices 100 are connected to the bus BS, and data are written into the four storage devices 100. However, n and m may take other values. For example, the same applies to the case of n=4 and m=2, i.e., the case where four storage devices 100 are connected to the bus BS, and data are written into two storage devices 100 out of the four storage devices 100.

As shown in FIG. 2, for example, the ID information item of each storage device 100 can be formed of 8 bits. For instance, the ID information items of the first through fourth storage devices 100-1 through 100-4 are ID=0x01, ID=0x0F, ID=0xE2, and ID=0xEF, respectively. In this example, "0x" indicates hexadecimal. It should be noted that the ID information items are not limited to those shown in FIG. 2, and may be formed of any number of bits other than 8 bits.

If the reset signal XRST is at an H level (high potential level; in a broader sense, first logic level), the storage device 100 is in a reset cancellation state. If the reset signal XRST is at an L level (low potential level; in a broader sense, second logic level), the storage device 100 is in a reset state. During the period in which the reset signal XRST is at the H level, i.e., the period in which reset is canceled, the host apparatus 400 transmits write data to the storage device 100.

More specifically, as shown in FIG. 2, the ID information item, a write command, and write data are sequentially transmitted in accordance with the clock SCK. For example, ICD1 in FIG. 2 shows a timing at which the ID information item (ID=0x01) corresponding to the first storage device 100-1, a write command, and write data are transmitted. Similarly, ICD2 through ICD4 show timings at which the ID information items (ID=0x0F, ID=0xE2, ID=0xEF) corresponding to the second through fourth storage devices 100-2 through 100-4, write commands, and write data are transmitted, respectively.

After completion of the transmission to the first through fourth storage devices 100-1 through 100-4, the reset signal XRST is set to the L level such that an acknowledgement waiting period TW starts. Then, after elapse of the acknowledgement waiting period TW, in each of the first through fourth (in a broader sense, m-th) reset cancellation periods in which the reset signal XRST output from the reset terminal HRST is at a level (e.g., H Level) indicating that reset is cancelled, the communication processing unit 410 of the host apparatus 400 transmits one of the four (in a broader sense, m) ID information items corresponding to the four (in a broader sense, m) storage devices 100, and performs an acknowledgement reception process.

More specifically, the communication processing unit 410 of the host apparatus 400 sets the reset signal XRST again to the H level, and transmits the ID information item ID1 (e.g., ID=0x01) in a first reset cancellation period TR1 and performs an acknowledgement reception process. Then, the communication processing unit 410 transmits the ID information items ID2 through ID4 (e.g., ID=0x0F, ID=0xE2, ID=0xEF) sequentially in the respective second through fourth reset cancellation periods TR2 through TR4, and performs an acknowledgement reception process.

More specifically, the communication processing unit 410 outputs, in a first clock period TC1 in each of the first through fourth reset cancellation periods TR1 through TR4, a clock of the first clock period TC1 from the clock terminal HCK. Then, in accordance with the clock of the first clock period TC1, the communication processing unit 410 outputs one of the ID information items from the data terminal HDA.

Further, the communication processing unit 410 outputs, in a second clock period TC2 after the first clock period TC1 in each of the reset cancellation periods, a clock of the second clock period TC2 from the clock terminal HCK for receiving an acknowledgement ACK.

The control unit 110 of each of the storage devices 100 receives, if the write data have been successfully written to the storage unit 120 of the storage device 100, one of the four (in a broader sense, m) ID information items corresponding to the four (in a broader sense, m) storage devices 100 in each of the first through fourth reset cancellation periods TR1 through TR4 in which the reset signal XRST that is input from the host apparatus 400 to the reset terminal TRST is at a level (e.g., H level) indicating that reset is cancelled. If the received one of the ID information items matches the ID information item of the storage device 100, the control unit 110 returns an acknowledgement ACK to the host apparatus 400.

More specifically, the control unit 110 of each storage device 100 receives one of the ID information items in accordance with the clock of the first clock period TC1 that is input to the clock terminal TCK, and returns an acknowledgement ACK in accordance with the clock of the second clock period TC2 that is input to the clock terminal TCK after the first clock period TC1.

For example, as shown in FIG. 2, the first storage device 100-1 (e.g., ID=0x01) returns an acknowledgement ACK in the second clock period TC2 in the first reset cancellation period TR1. Subsequently, the second storage device 100-2 (e.g., ID=0x0F) returns an acknowledgement ACK in the second clock period TC2 in the second reset cancellation period TR2. Similarly, the third and fourth storage devices 100-3 and 100-4 (e.g., ID=0xE2, ID=0xEF) return acknowledgements in the second clock periods TC2 in the third and fourth reset cancellation periods TR3 and TR4, respectively.

The host apparatus 400 receives the acknowledgements ACK from the respective storage devices 100 in the second clock periods TC2 in the respective first through fourth reset cancellation periods TR1 through TR4.

The acknowledgement ACK is a signal of a logic level representing an acknowledgement (write completion notice), and is output from the data terminal TDA of each storage device 100 in accordance with the clock of the second clock period TC2. More specifically, as shown in FIG. 2, for example, the acknowledgement ACK is set to the H level in the second clock period TC2 and slowly falls to the L level after the end of the second clock period TC2. It should be noted that the waveform of the signal indicating an acknowledgement ACK is not limited to that shown in FIG. 2.

The host apparatus 400 can determine, after sending an ID information item, whether an acknowledgement ACK is transmitted from the storage device 100 corresponding to the transmitted ID information item, and hence can specify the storage device 100 into which data have not been successfully written. Then, the host apparatus 400 can perform a rewrite (retry) operation with respect to the storage device 100 into which data have not been successfully written.

The acknowledgement waiting period TW is a waiting period from after completion of transmission of the write data to the m storage devices 100 until the host apparatus 400 transmits an ID information item for requesting a return of an acknowledgement. That is, the host apparatus 400 outputs an ID information item after elapse of the acknowledgement waiting period TW. More specifically, in the storage device 100, the length of the acknowledgement waiting period tTW satisfies tTM≤tTW<2×tTM wherein tTM represents the length of a time period (a necessary write period) required to write data into the storage unit 120.

Thus, the host apparatus 400 can wait for the last storage device 100 among the m storage devices 100 to which data are transmitted to complete a data writing operation and be ready to return an acknowledgement. For example, in FIG. 2, since the acknowledgement waiting period TW is provided, the host apparatus 400 can wait for the last storage device 100 (i.e., the fourth storage device 100-4) to which data are transmitted to complete a data writing operation and be ready to return an acknowledgement.

Figure 3:
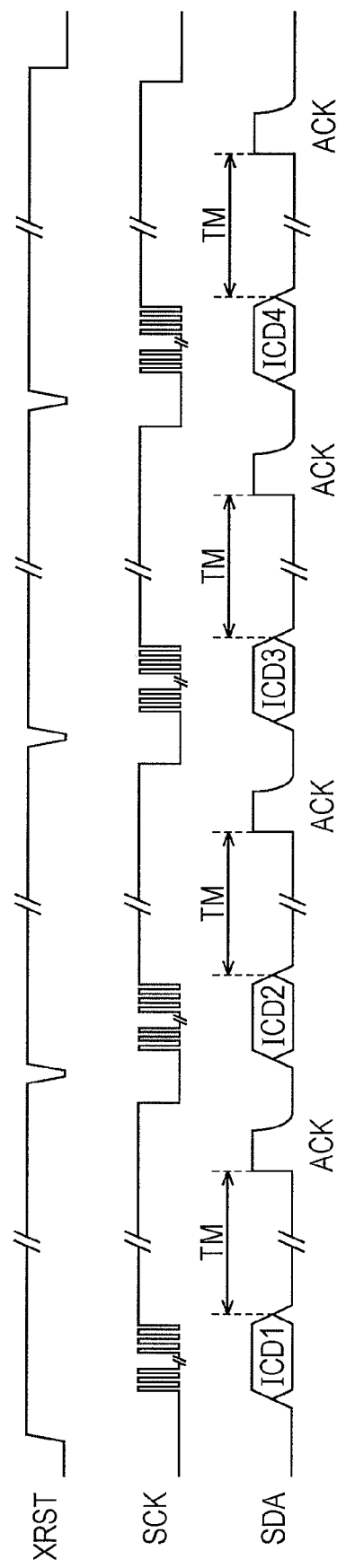
FIG. 3 is a timing chart of a comparative example.

FIG. 3 shows, as a comparative example, a timing chart illustrating a configuration in which each storage device returns an acknowledgement after completion of a write operation with respect to each storage device instead of sequentially returning acknowledgements after completion of write operations to m storage devices.

In the comparative example of FIG. 3, for instance, an ID information item (ID=1), a write command, and write data are transmitted to a first storage device (ID=1) (ICD1 in FIG. 3). After the data are written into a storage unit of the first storage device, an acknowledgement ACK is returned. Then, similarly, data are transmitted to a second storage device (ID=2). After completion of a data writing operation, an acknowledgement ACK is returned.

As shown in FIG. 3, in the comparative example, after elapse of a time period from the reception of the write data by the storage device to the completion of the data writing operation, i.e., after elapse of a necessary write period TM, the storage device returns an acknowledgement ACK. Accordingly, as shown in FIG. 3, for example, in the case where four storage devices are connected, a length (4×tTM) of time four times the length of the necessary write period TM is required in addition to the time required for communication of data and the like. Usually, the time required to write data into a storage unit is longer than the time required for communication. For example, the time required for communication of data and the like with one storage device is about 100 µs, but the length of the necessary write period TM is about 5 ms. Accordingly, in the comparative example of FIG. 3, the overall length of the necessary write period is about 20 ms.

On the other hand, according to the storage device and the host apparatus of this embodiment, as shown in FIG. 2, a single acknowledgement waiting period TW may be provided. The length tTW of the acknowledgement waiting period TW satisfies tTM≤tTW<2×tTM, as mentioned above. For instance, when tTM=5 ms, then 5 ms≤tTW<10 ms. Thus, the time required for the data write process can be reduced compared to the comparative example of FIG. 3. Further, in the comparative example, the overall write time increases in proportion to the number of storage devices. On the other hand, according to the storage device and the host apparatus of this embodiment, although the time required for communication increases, the length of the acknowledgement waiting period TW does not increase.

As described above, according to the storage device and the host apparatus of this embodiment, in the process in which the host apparatus writes data into respective ones of the plurality of storage devices connected to the bus, the host apparatus can sequentially receive acknowledgements ACK after completion of data transmission to the respective storage devices. Therefore, it is possible to reduce the overall write process time. Further, even if the number of storage devices is increased, the length of the acknowledgement waiting period does not increase, which makes it possible to minimize the increase of the overall write process time.

2. Data Write Process

Figure 4:
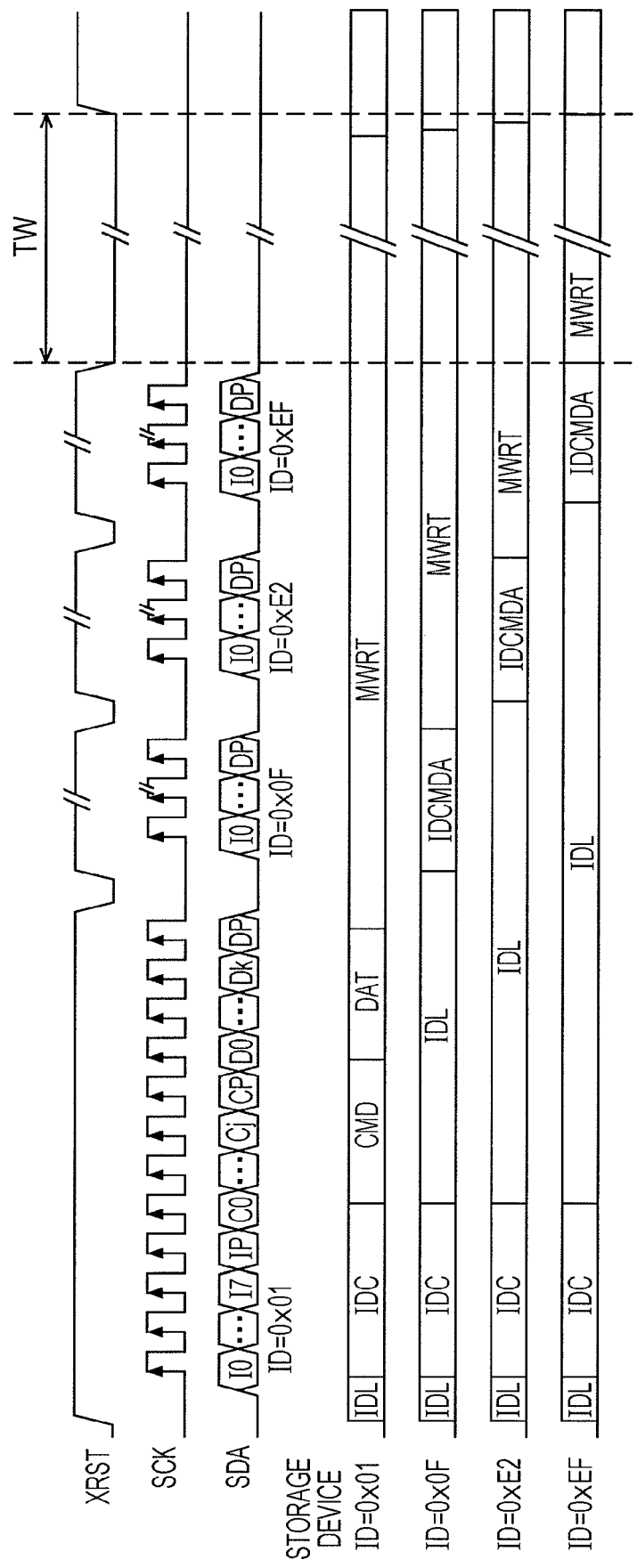
FIG. 4 is a detailed timing chart illustrating a process of writing data.

FIG. 4 shows a detailed timing chart illustrating a process from transmitting data from the host apparatus 400 to the first through fourth storage devices 100-1 through 100-4 to writing the data into the storage unit 120 of each of the storage devices 100.

First, the host apparatus 400 transmits an ID information item, a write command, and data to the first storage device 100-1 (ID=0x01). As shown in FIG. 4, the ID information item is formed of 8 bits of I0 through I7, and a parity bit IP is added thereto. Further, for example, the write command is formed of j+1 bits of C0 through Cj (j is a natural number), and a parity bit CP is added thereto. Further, for example, the data are formed of k+1 bits of D0 through Dk, and a parity bit DP is added thereto. The parity bits IP, CP, and DP are added for parity check such that the number of 1 s is always an even number or an odd number.

In an ID recognition period IDC, the ID comparator ID_COMP of the first storage device 100-1 (ID=0x01) recognizes that the received ID information item matches an ID information item of the first storage device 100-1. In a following command recognition period CMD, the operation code decoder OPCDEC recognizes that the received command is a write command. Then, in a following data reception period DAT, the I/O controller I/O_CNTL receives the data and outputs the data to the storage control unit 130. In a following memory write period MWRT, the storage control unit 130 writes the data into the storage unit 120. If the data have been successfully written, the storage control unit 130 sets an internal acknowledgement signal i_ack to the H level. After that, the first storage device 100-1 waits for an ID information item for requesting a return of an acknowledgement to be transmitted from the host apparatus 400.

On the other hand, the ID comparator ID_COMP of the second storage device 100-2 (ID=0x0F) recognizes that the received ID information item does not match an ID information item of the second storage device 100-2. Then, the second storage device 100-2 is placed in an idle period IDL without receiving a command and data. In a following ID recognition period IDC, if a received ID information item matches the ID information item of the second storage device 100-2, a write command and data are received. It should be noted that, in FIG. 4, the ID recognition period IDC, the command recognition period CMD, and the data reception period DAT are collectively denoted by IDCMDA. Then, in a memory write period MWRT, the data are written into the storage unit 120. If the data have been successfully written, an internal acknowledgement signal i_ack is set to the H level. After that, the second storage device 100-2 waits for an ID information item for requesting for a return of an acknowledgement to be transmitted from the host apparatus 400.

Similarly, in each of the third and fourth storage devices 100-3 and 100-4 (ID=0xE2, ID=0xEF), if it is recognized that a received ID information item matches an ID information item of each of the third and fourth storage devices 100-3 and 100-4, a write command and data are received, and the data are written into the storage unit 120 in a memory write period MWRT. If the data have been successfully written, an internal acknowledgement signal i_ack is set to the H level. After that, each of the third and fourth storage devices 100-3 and 100-4 waits for an ID information item for requesting for a return of an acknowledgement to be transmitted from the host apparatus 400.

As shown in FIG. 4, the acknowledgement waiting period TW corresponds to a period of time required to write data into the storage unit 120 in the fourth storage device 100-4 which is the last to execute a data writing operation.

Figure 5:
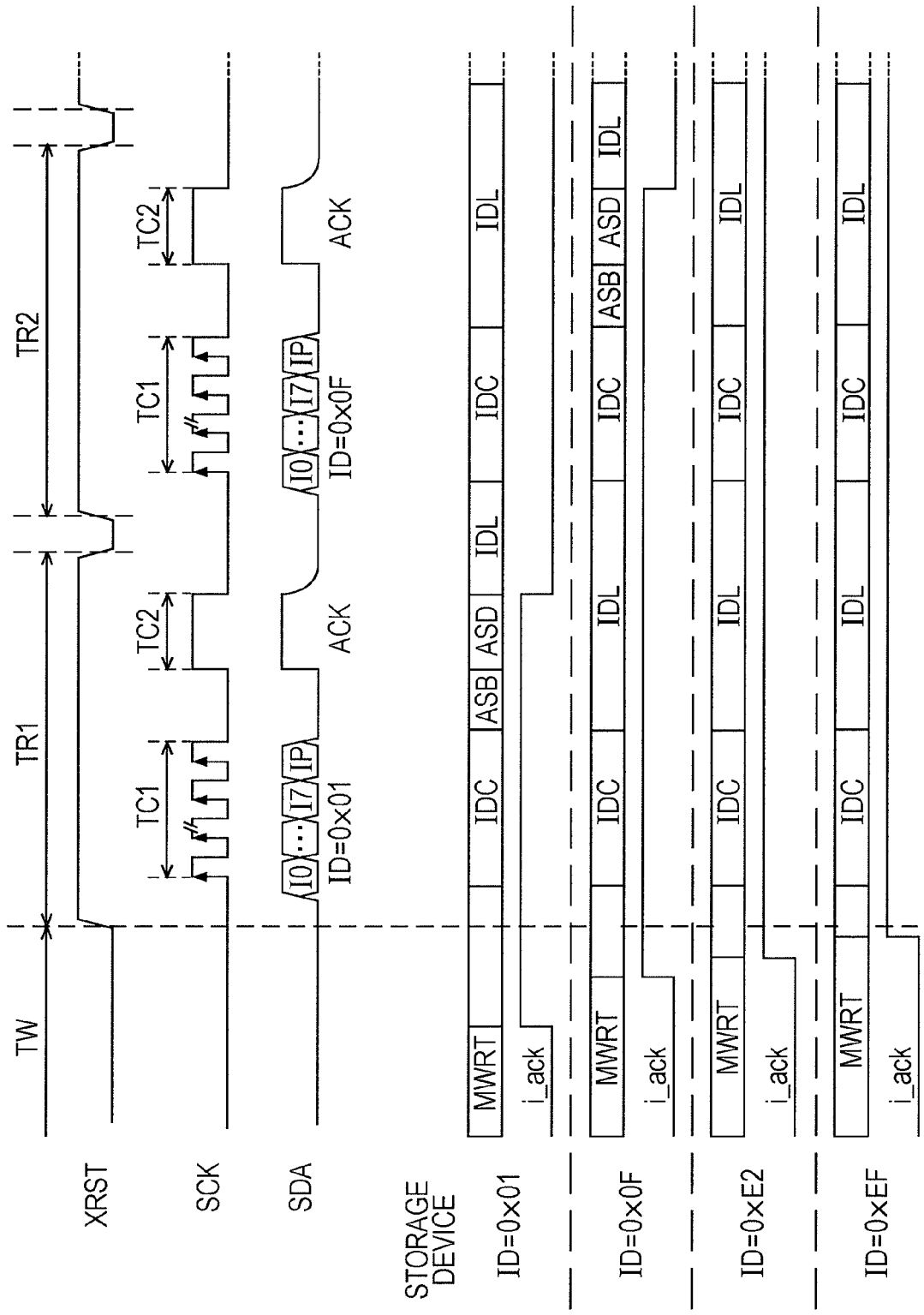
FIG. 5 is a timing chart illustrating a process of returning an acknowledgement.

FIG. 5 is a detailed timing chart illustrating a process from transmitting an ID information item from the host apparatus 400 after data are written into the storage unit 120 of each storage device 100 to returning an acknowledgement ACK from each storage device 100. It should be noted that FIG. 5 only shows the ACK return by the first and second storage devices 100-1 and 100-2. The ACK return by the third and fourth storage devices 100-3 and 100-4 is similar to the ACK return by the first and second storage devices 100-1 and 100-2, and a description thereof is omitted.

After elapse of the acknowledgement waiting period TW, the host apparatus 400 sets the reset signal XRST to the H level. At this timing, a first reset cancellation period TR1 starts. Since the fourth storage device 100-4 (ID=0xEF) has completed the data writing operation by this time, all the first through fourth storage devices 100-1 through 100-4 are ready to return an acknowledgement.

In the first reset cancellation period TR1, the host apparatus 400 transmits a clock in a first clock period TC1, and transmits the ID information item (ID-0x01) of the first storage device 100-1 in accordance with the clock. The first storage device 100-1 receives the ID information item in accordance with the clock of the first clock period TC1, and recognizes that the received ID information item matches the ID information item thereof (ID recognition period IDC). Then, since the internal acknowledgement signal i_ack is at the H level, the first storage device 100-1 is shifted to an ACK return standby period ASB. After the end of the first clock period TC1, the host apparatus 400 transmits a clock for receiving an acknowledgement ACK in a second clock period TC2. Thus, the first storage device 100-1 returns an acknowledgement ACK in accordance with the clock of the second clock period TC2 (ACK output period ASD). The second through fourth storage devices 100-2 through 100-4 receive the ID information item in the ID recognition period IDC. However, since the received ID information item does not match the ID information items thereof, the second through fourth storage devices 100-2 through 100-4 is shifted to an idle period IDL.

In the second reset cancellation period TR2, the host apparatus 400 transmits a clock in a first clock period TC1, and transmits the ID information item (ID-0x0F) of the second storage device 100-2 in accordance with the clock. The second storage device 100-2 receives the ID information item in accordance with the clock of the first clock period TC1, and recognizes that the received ID information item matches the ID information item thereof (ID recognition period IDC). Then, since the internal acknowledgement signal i_ack is at the H level, the second storage device 100-2 is shifted to an ACK return standby period ASB. After the end the first clock period TC1, the host apparatus 400 transmits a clock for receiving an acknowledgement ACK in a second clock period TC2. Thus, the second storage device 100-2 returns an acknowledgement ACK in accordance with the clock of the second clock period TC2 (ACK output period ASD). The first, third, and fourth storage devices 100-1, 100-3, and 100-4 receive the ID information item in the ID recognition period IDC. However, since the received ID information item does not match the ID information items thereof, the first, third, and fourth storage devices 100-1, 100-3, and 100-4 are shifted to an idle period IDL.

Similarly, the third and fourth storage devices 100-3 and 100-4 return an acknowledgement ACK in the third and fourth reset cancellation periods TR3 and TR4, respectively.

In FIG. 5, each storage device 100 sets the data terminal TDA to the H level in the ACK output period ASD, and sets the data terminal TDA to the high impedance state in other periods. In this way, the signal level of the data signal line SDA is maintained at the H level in the ACK output period ASD (i.e., the second clock period TC2) and, after that, slowly falls to the L level. It should be noted that, as will be described later, the waveform of the signal indicating an acknowledgement ACK is not limited to that shown in FIG. 5 and may have other waveforms.

Figure 6:
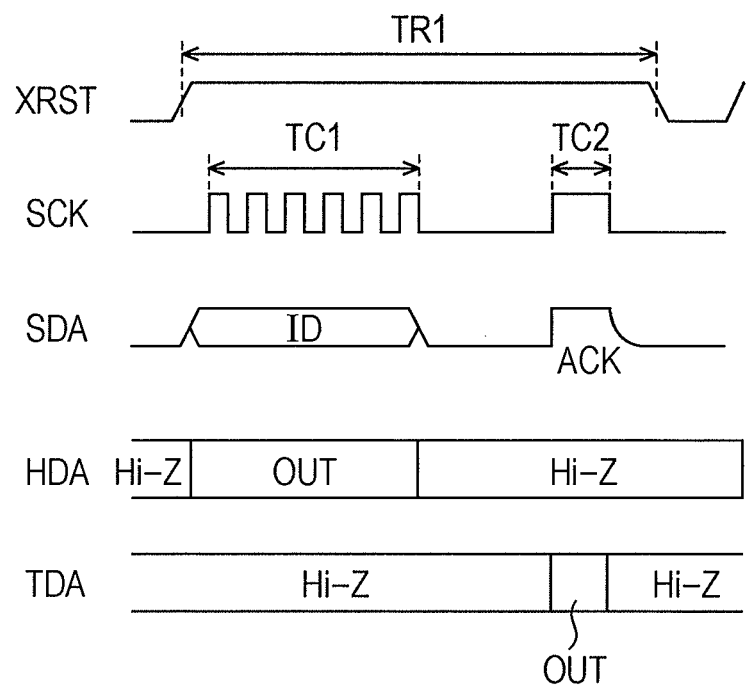
FIG. 6 is a diagram illustrating the state of a data terminal of a host apparatus and a data terminal of a first storage device.

FIG. 6 is a diagram illustrating the state of the data terminal HDA of the host apparatus 400 and the data terminal TDA of the first storage device 100-1 in the first reset cancellation period TR1. It should be noted that the second through fourth reset cancellation periods TR2 through TR4 are similar to the reset cancellation period TR1, and a description thereof is omitted.

As shown in FIG. 6, the data terminal HDA of the host apparatus 400 is in an output state OUT for outputting an ID information item in the first clock period TC1, and is in a high impedance state Hi-Z in other periods. That is, the communication processing unit 410 of the host apparatus 400 sets the data terminal HDA to the high impedance state Hi-Z after the end of the first clock period TC1. Meanwhile, the data terminal TDA of the first storage device 100-1 is in an output state OUT for outputting an acknowledgement ACK in the second clock period TC2, and is in the high impedance state Hi-Z in other periods. Further, although not shown, the data terminals TDA of the second through fourth storage devices 100-2 through 100-4 are in the high impedance state Hi-Z as the second through fourth storage devices 100-2 through 100-4 do not output an acknowledgement ACK. This makes it possible to prevent, in the first clock period TC1, a signal of the ID information item output from the host apparatus 400 from being interfered by the first through fourth storage devices 100-1 through 100-4. This also makes it possible to prevent, in the second clock period TC2, an ACK signal output from the first storage device 100-1 from being interfered by the host apparatus 400 and the other storage devices 100.

Further, in a period between the first clock period TC1 and the second clock period TC2, both the data terminal TDA of the storage device 100 and the data terminal HDA of the host apparatus 400 are set to the high impedance state Hi-Z. In this way, a period in which all the data terminals connected to the data signal line of the bus BS are set to the high impedance state Hi-Z is provided. This makes it possible to prevent mutual interference between the signal of the ID information item and the ACK signal, thereby achieving reliable transmission/reception of both signals.

Figure 7A:
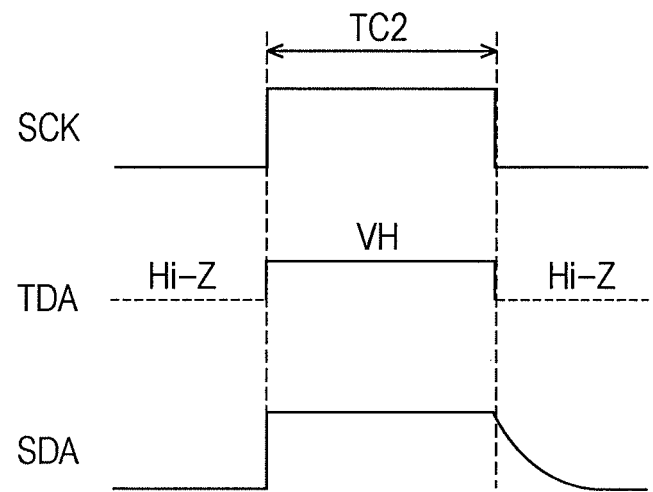
FIGS. 7A and 7B are diagrams each illustrating a waveform of an acknowledgement signal.
Figure 7B:
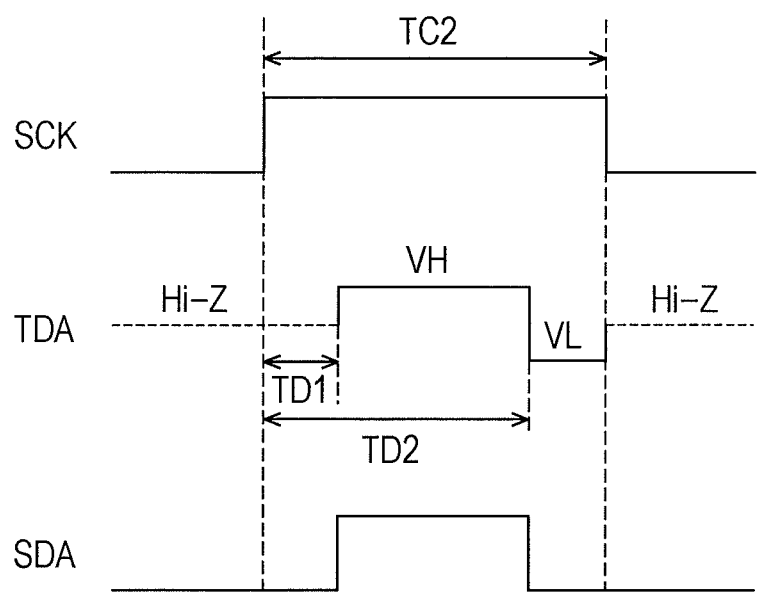

FIG. 7A and FIG. 7B are diagrams each illustrating a waveform of the acknowledgement ACK signal output by the storage device 100.

The ACK signal waveform shown in FIG. 7A corresponds to the ACK signal waveform shown in FIG. 6, for example. That is, the storage device 100 sets the data terminal TDA to the H level VH in the second clock period TC2, and sets the data terminal TDA to the high impedance state Hi-Z in other periods. A resistance element (terminating resistance element) is disposed between the data terminal HDA and a second power supply node VSS (low potential power supply node) of the host apparatus 400. This resistance element discharges electric charges, so that the voltage level of the data signal line SDA slowly falls to the L level after the end of the second clock period TC2.

FIG. 7B shows another example of the ACK signal waveform. In the case of the ACK signal waveform of FIG. 7B, the control unit 110 of the storage device 100 shifts the voltage level of the data terminal TDA from the high impedance state Hi-Z to the H level VH (in a broader sense, the first logic level) and then shifts the voltage level of the data terminal TDA from the H level VH to the L level VL (in a broader sense, the second logic level) in accordance with the clock of the second clock period TC2. Then, after the end of the second clock period TC2, the control unit 110 sets the data terminal TDA back to the high impedance state Hi-Z.

More specifically, the control unit 110 sets the data terminal TDA in the high impedance state during a period until the lapse of a first delay time TD1 from the start of the second clock period TC2 and, after that, sets the terminal TDA to the H level. Then, the control unit 110 maintains the terminal TDA at the H level during a period until the lapse of a second delay period TD2 from the start of the second clock period TC2 and, after that, sets the terminal TDA to the L level. Then, at the end of the second clock period TC2, the control unit 110 sets the data terminal TDA back to the high impedance state Hi-Z.

In the case of the ACK signal waveform of FIG. 7B, in the last half of the second clock period TC2, the voltage level of the data terminal TDA is shifted from the H level to the VH level, which makes it possible to rapidly lower the voltage level of the data signal line SDA. In this way, the waiting time for the next reset cancellation period can be reduced, which makes it possible to further reduce the overall write process time.

As described above, according to the storage device and the host apparatus of this embodiment, in the process in which the host apparatus writes data into respective ones of the plurality of storage devices connected to the bus, the host apparatus can sequentially receive acknowledgements ACK after completion of data transmission to the respective storage devices. Thus, there is no necessity to provide an acknowledgement waiting period for each of the storage devices, and a single acknowledge waiting period may be provided. Therefore, it is possible to reduce the overall write process time. Further, even if the number of storage devices is increased, the length of the acknowledgement waiting period does not increase, which makes it possible to minimize the increase of the overall write process time.

Figure 8:
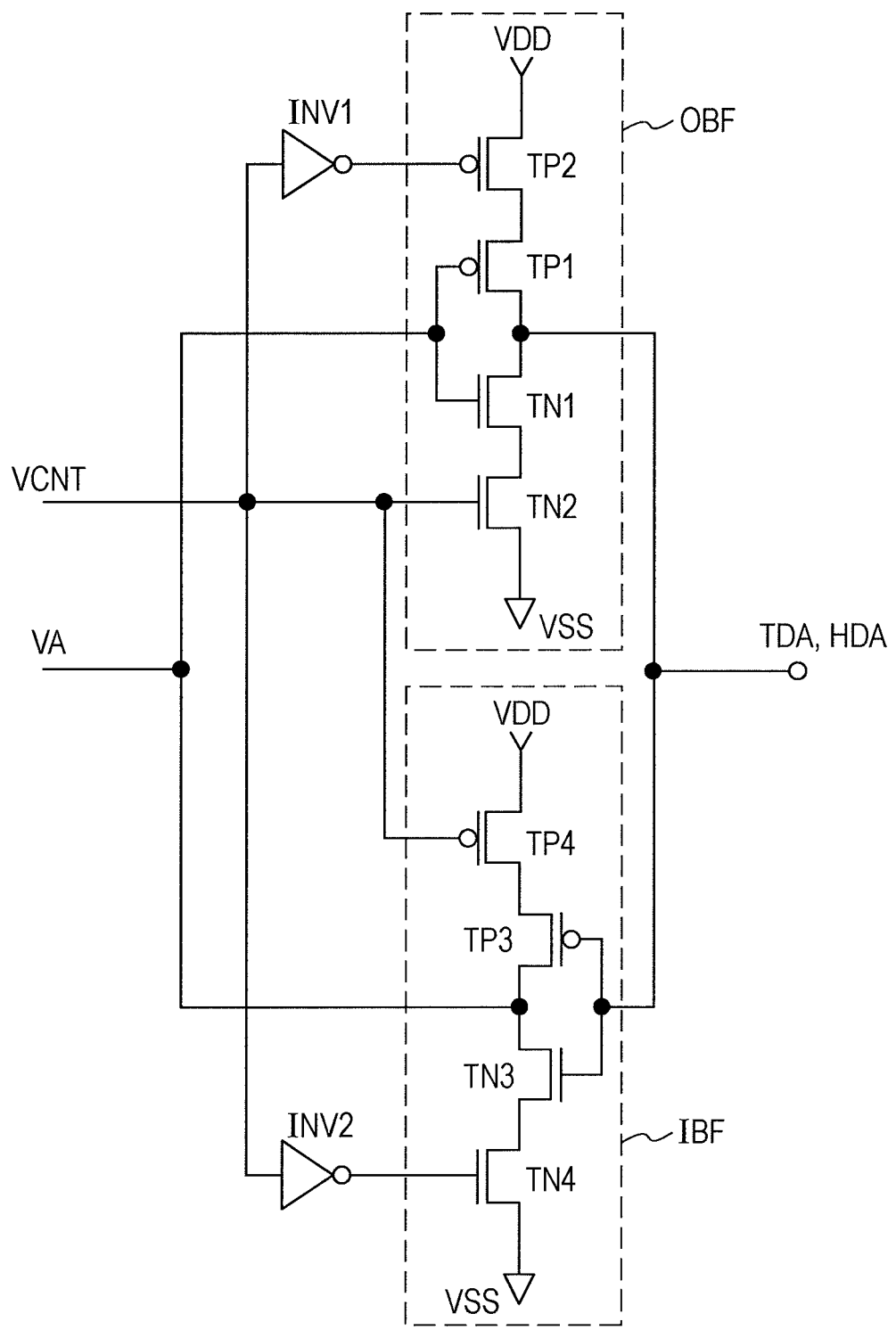
FIG. 8 is a diagram showing an exemplary configuration of an input/output buffer.

FIG. 8 is a diagram showing an exemplary configuration of an input/output buffer connected to each of the data terminals TDA and HDA of the storage device 100 and the host apparatus 400. The input/output buffer of FIG. 8 is provided in each of the control unit 110 of the storage device 100 and the communication processing unit 410 of the host apparatus 400.

The input/output buffer includes an output buffer OBF, an input buffer IBF, and two inverters INV1 and INV2. The output buffer OBF includes P-type transistors TP1 and TP2, and N-type transistors TN1 and TN2. The input buffer IBF includes P-type transistors TP3 and TP4, and N-type transistors TN3 and TN4.

A control signal VCNT serves to set an operation mode (an input mode and an output mode) of the input/output buffer. If the input/output buffer is in the input mode, a signal from the data terminal TDA (or HDA) is buffered, and is supplied as an internal signal VA to an internal circuit. On the other hand, if the input/output buffer is in the output mode, an internal signal VA from the internal circuit is buffered, and is output from the data terminal TDA (or HDA).

If the control signal VCNT is at the H level, a gate of the N-type transistor TN2 is set to the H level, and a gate of the P-type transistor TP2 is set to the L level. Thus, both the N-type transistor TN2 and the P-type transistor TP2 are placed in an ON state. On the other hand, a gate of the N-type transistor TN4 is set to the L level, and a gate of the P-type transistor TP4 is set to the H level. Thus, both the N-type transistor TN4 and P-type transistor TP4 are placed in an OFF state. Accordingly, the output buffer OBF can buffer the internal signal VA, and output the internal signal VA from the data terminal TDA (or HDA). Meanwhile, the input buffer IBF is disconnected from first and second power supply terminals VDD and VSS and therefore is not activated.

If the control signal VCNT is at the L level, the gate of the N-type transistor TN2 is set to the L level, and the gate of the P-type transistor TP2 is set to the H level. Thus, both the N-type transistor TN2 and the P-type transistor TP2 are placed in the OFF state. On the other hand, the gate of the N-type transistor TN4 is set to the H level, and the gate of the P-type transistor TP4 is set to the L level. Thus, both the N-type transistor TN4 and P-type transistor TP4 are placed in the ON state. Accordingly, the input buffer IBF can buffer the input signal from the data terminal TDA (or HDA), and output the input signal to the internal circuit. Meanwhile, the output buffer OBF is disconnected from the first and second power supply terminals VDD and VSS and therefore is not activated. Thus, the data terminal TDA (of HDA) is set to the high impedance state.

In this way, with use of the input/output buffer of FIG. 8, as shown in FIG. 6, it is possible to set the data terminal HDA to the output state and set the data terminal TDA to the high impedance state in the first clock period TC1. Further, it is possible to set the data terminal TDA to the output state and set the data terminal HDA to the high impedance state in the second clock period TC2. Further, it is possible to set both the data terminal HDA and the data terminal TDA to the high impedance state in the period between the first clock period TC1 and the second clock period TC2.

3. System, Liquid Container, and Circuit Substrate

Figure 9:
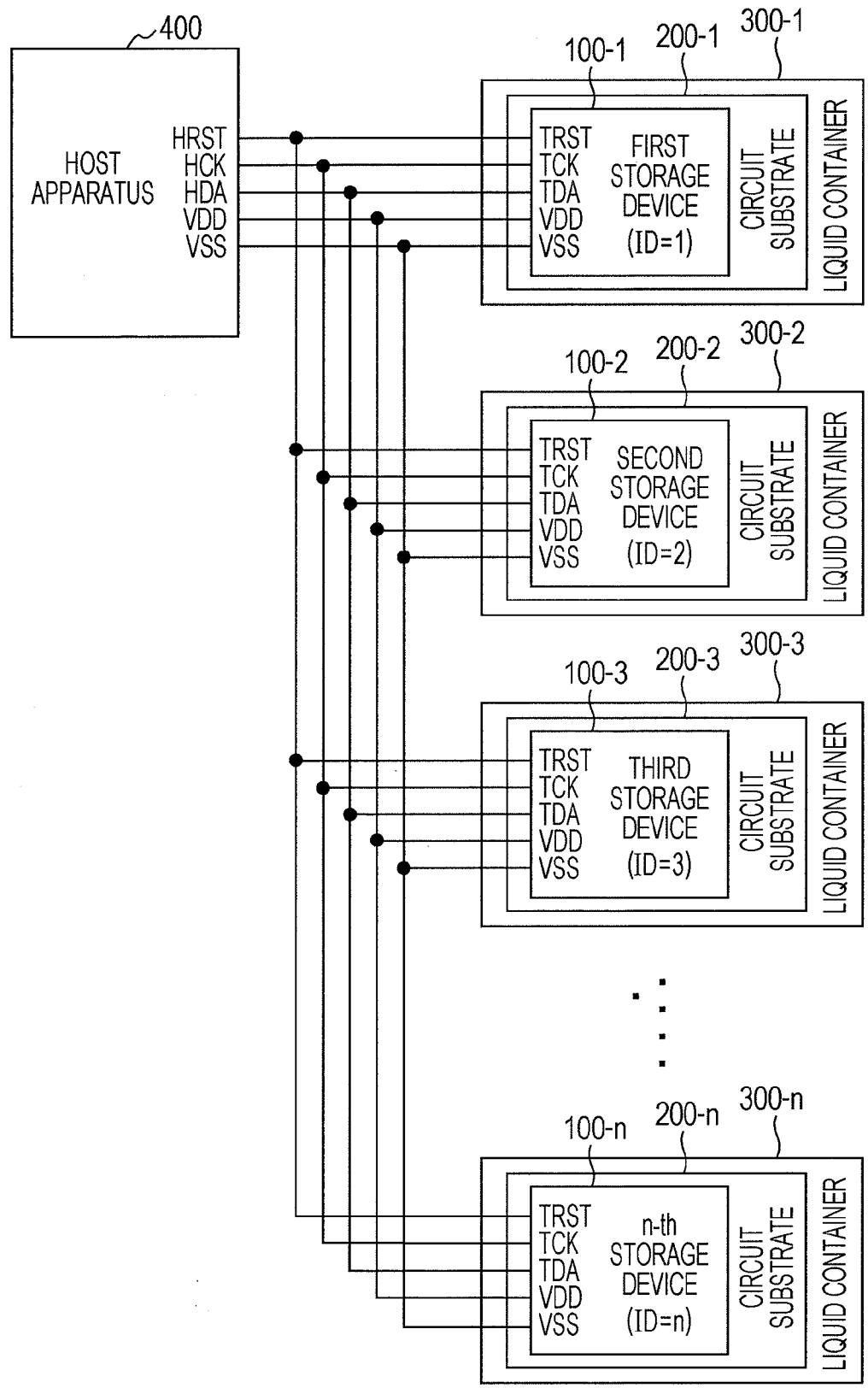
FIG. 9 is a diagram showing an exemplary basic configuration of a system.

FIG. 9 is a diagram illustrating an exemplary basic configuration of a system according to this embodiment. The system of this embodiment may be an ink jet printer, for example, and includes first through n-th (n is an integer equal to or greater than 2) storage devices 100-1 through 100-n, n circuit substrates 200-1 through 200-n on which the first through n-th storage devices 100-1 through 100-n are mounted, respectively, n liquid containers 300-1 through 300-n provided with the n circuit substrates 200-1 through 200-n, respectively, and a host apparatus 400. The system of this embodiment is not limited to the configuration shown in FIG. 9, and may be variously modified by, for example, omitting some of the elements, replacing some of the elements with other elements, or adding other elements.

In the following, a description is given of an example in which the host apparatus 400 is an ink jet printer main body; the liquid container 300 is an ink cartridge; and the circuit substrate 200 is provided in the ink cartridge. It should be noted that, according to this embodiment, the host apparatus 400, the liquid container 300, the circuit substrate 200 may be other apparatuses, other containers, and other circuit substrates, respectively. For example, the host apparatus 400 may be a reader/writer of a memory card, and the circuit substrate 200 may be provided in the memory card.

Each of the first storage device 100-1 through the n-th storage device 100-n includes a reset terminal TRST, a clock terminal TCK, a data terminal TDA, a first power supply terminal VDD, and a second power supply terminal VSS. These n storage devices 100-1 through 100-n include storage units 120 (e.g., a nonvolatile memory), in which ID information items (e.g., ID=1, ID=2, ID=3, and so on) for identifying the n liquid containers 300-1 through 300-n (e.g., ink cartridges) are stored, respectively. Different ID information items are assigned to different types (e.g., color) of liquids stored in the liquid containers 300-1 through 300-n.

The host apparatus 400 may be a printer main body, for example, and includes a host-side reset terminal HRST, a host-side clock terminal HCK, a host-side data terminal HDA, a first power supply terminal VDD, and a second power supply terminal VDD.

As described above, according to the storage device, the host apparatus, and the system of this embodiment, in the process in which the host apparatus (printer main body) writes data into respective ones of the plurality of storage devices connected to the bus, the host apparatus can sequentially receive acknowledgements ACK after completion of data transmission to the respective storage devices. Therefore, it is possible to reduce the overall write process time.

In ink jet printers, since ink cartridges (liquid containers) are usually configured to be replaceable, a contact failure is likely to occur in an electrical connection. For example, if a contact failure occurs in a data terminal during transmission, a transmission error may occur, or wrong data may be written. Further, if a contact failure occurs in a power supply terminal during a write operation with respect to a storage unit, a writing error may occur. To prevent occurrence of such troubles, it is desirable to reduce the time required for a process of write from the host apparatus to each storage device as much as possible.

According to the storage device, the host apparatus, and the system of this embodiment, the time required for a process of write from the host apparatus to each storage device can be reduced. This makes it possible to reduce occurrence of troubles due to a contact failure in an electrical connection and the like.

Figure 10:
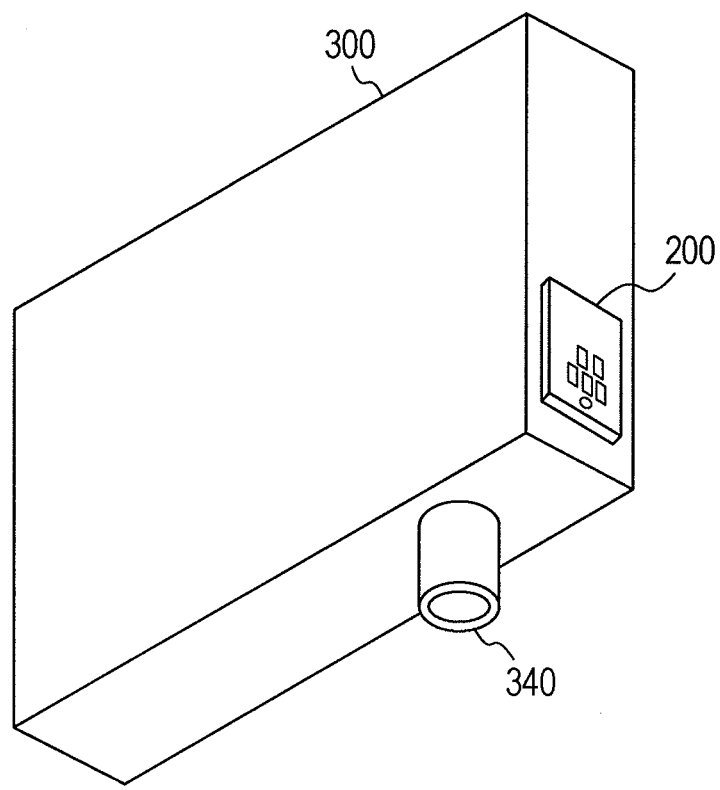
FIG. 10 is a diagram showing an exemplary basic configuration of a liquid container.

FIG. 10 is a diagram illustrating a detailed exemplary configuration of the liquid container (ink cartridge) 300 of this embodiment. An ink chamber (not shown) for storing ink is formed inside the liquid container 300. Further, the liquid container 300 is provided with an ink supply port 340 communicating with the ink chamber. The ink supply port 340 serves to supply ink to a print head unit when the liquid container 300 is attached to the printer.

The liquid container 300 includes the circuit substrate 200. The circuit substrate 200 is provided with the storage device 100 of this embodiment, and is configured to store data, such as ink consumption, and perform data transmission to and reception from the host apparatus 400. The circuit substrate 200 may be implemented as a printed substrate, for example, and is provided on the surface of the liquid container 300. The circuit substrate 200 is provided with terminals such as a first power supply terminals VDD. Then, when the liquid container 300 is attached to the printer, these terminals come into contact with (i.e., are electrically connected to) terminals of the printer, which enables exchange of power and data.

Figure 11A:
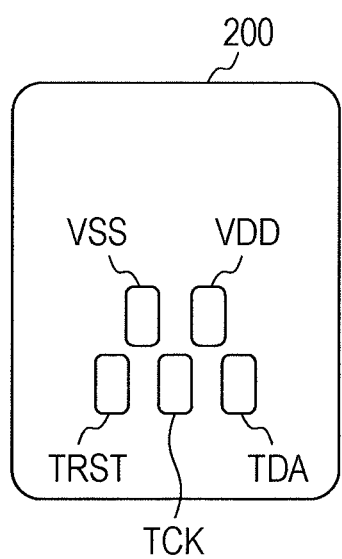
FIGS. 11A and 11B are diagrams each showing an exemplary configuration of a circuit substrate.
Figure 11B:
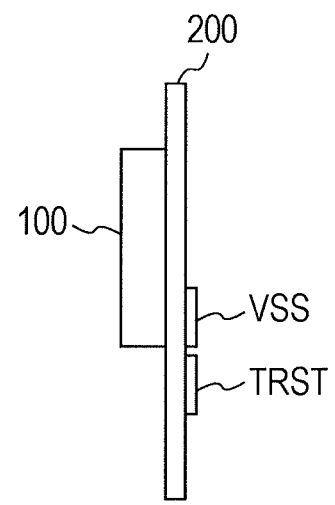

FIGS. 11A and 11B are diagrams each showing an exemplary configuration of the circuit substrate 200 provided with the storage device 100 of this embodiment. Referring to FIG. 11A, a terminal group including a plurality of terminals is disposed on a front surface (a surface connected to the printer) of the circuit substrate 200. This terminal group includes a first power supply terminal VDD, a second power supply terminal VSS, a reset terminal TRST, a clock terminal TCK, and a data terminal TDA. Each of the terminals is implemented as a metal terminal formed in a rectangular shape (substantially rectangular shape), for example. Further, each of the terminals is connected to the storage device 100 through a wiring pattern layer and through-holes (not shown) provided in the circuit substrate 200.

Referring to FIG. 11B, the storage device 100 of this embodiment is disposed on a back surface (a surface opposite to the surface connected the printer) of the circuit substrate 200. The storage device 100 may be implemented as a semiconductor storage device having an EEPROM, a flash memory, a ferroelectric memory, or the like. The storage device 100 stores various types of data related to the ink or the liquid container 300. For example, the storage device 100 stores an ID information item for identifying the liquid container 300 and data on the ink consumption, etc. The data of the ink consumption indicate the total amount of the ink consumed from the liquid container 300 by execution of printing operations and the like. The data on the ink consumption may indicate the amount of the ink in the liquid container 300 or the proportion of the amount of the consumed ink.

While the embodiments are described in detail above, it will be easily understood by those skilled in the art that various modifications can be made without substantially departing from the new matters and the effects of the invention. Therefore, all such modifications are regarded as within the scope of the invention. For example, a term described together with a different term in a broader sense or an equivalent term at least once in the specification or the drawings can be replaced with such a term in any place in the specification or the drawings. Also, the configurations and operations of the storage device, the host apparatus, the circuit substrate, the liquid container, and the system are not limited to those described in the embodiments, and various modifications can be made thereto.

The entire disclosure of Japanese Patent Application No. 2011-096486, filed on Apr. 22, 2011 is expressly incorporated herein by reference.

What is claimed is:

1. A storage device comprising:
   a control unit that performs a process of communicating with a host apparatus which is connected to the storage device through a bus;
   a storage unit into which data transmitted from the host apparatus are written;
   a storage control unit that performs access control on the storage unit,
   wherein the control unit is configured to receive an ID information item from the host apparatus after an end of a period of writing data from the host apparatus to m storage devices of a plurality of the storage devices connected to the bus, m being an integer equal to or greater than 1, and return an acknowledgement to the host apparatus if the data transmitted from the host apparatus have been successfully written to the storage unit of the storage; and
   a reset terminal,
   wherein the control unit is configured to receive one of m ID information items corresponding to the m storage devices and return the acknowledgement to the host apparatus when the received one of the ID information items matches an ID information item of the storage device in each of first through m-th reset cancellation periods, m being an integer equal to or greater than 2, in which a reset signal input to the reset terminal from the host apparatus is at a level indicating that reset is cancelled.

2. The storage device according to claim 1, further comprising:
a clock terminal,
wherein the control unit is configured to receive the one of the ID information items in accordance with a clock of a first clock period that is input to the clock terminal, and return the acknowledgement in accordance with a clock of a second period that is input to the clock terminal after the first clock period.

3. The storage device according to claim 2, wherein the control unit is configured to determine whether the data transmitted from the host apparatus have been successfully written to the storage unit based on an internal acknowledgement signal that is output from the storage control unit.

4. The storage device according to claim 2, further comprising:
a data terminal, wherein the control unit is configured to output the acknowledgement, that is a signal of a logic level representing the acknowledgement, from the data terminal within the second clock period.

5. The storage device according to claim 4, wherein the control unit is configured to shift the data terminal from a high impedance state to a first logic level and then shift the data terminal from the first logic level to a second logic level in accordance with the clock of the second clock period; and shift the data terminal back to the high impedance state after an end of the second clock period.

6. A host apparatus comprising:
a communication processing unit that performs a process of communicating with a plurality of storage devices which are connected to the host apparatus through a bus;
a control unit that controls the communication processing unit,
wherein the communication processing unit is configured to, after an end of a period of writing data from the host apparatus to m storage devices of the plurality of storage devices, m being an integer equal to or greater than 1, transmit m ID information items corresponding to the m storage devices, and perform an acknowledgement reception process after transmission of the ID information items; and
a reset terminal,
wherein the communication processing unit is configured to transmit one of the m ID information items in each of first through m-th reset cancellation periods, m being an integer equal to or greater than 2, in which a reset signal output from the reset terminal is at a level indicating that reset is cancelled, and perform the acknowledgement reception process.

7. The host apparatus according to claim 6, further comprising:
a clock terminal; and
a data terminal,
wherein the communication processing unit is configured to, in a first clock period in each of the first through m-th reset cancellation periods, output a clock of the first clock period from the clock terminal, and output one of the m ID information items from the data terminal in accordance with the clock of the first clock period; and, in a second clock period after the first clock period in each of the reset cancellation periods, output from the clock terminal a clock of the second clock for receiving the acknowledgement.

8. The host apparatus according to claim 7, wherein the communication processing unit is configured to set the data terminal to a high impedance state after an end the first clock period.

9. A circuit substrate comprising:
the storage device according to claim 1.

10. A circuit substrate comprising:
the storage device according to claim 2.

11. A circuit substrate comprising:
the storage device according to claim 3.

12. A circuit substrate comprising:
the storage device according to claim 4.

13. A circuit substrate comprising:
the storage device according to claim 5.

14. A liquid container comprising:
the storage device according to claim 1.

15. A system comprising:
the storage device according to claim 1; and
the host apparatus according to claim 6.

16. A system comprising:
the storage device according to claim 4; and
the host apparatus according to claim 7.

17. The system according to claim 16, wherein both the data terminal of the storage device and the data terminal of the host apparatus are set to a high impedance state in a period between the first clock period and the second clock period.

* * * * *